United States Patent [19]

Johnson

[11] Patent Number: 5,437,936
[45] Date of Patent: Aug. 1, 1995

[54] HONEYCOMB CORE STRUCTURE AND METHOD AND APPARATUS RELATING THERETO

[76] Inventor: Jeffrey D. Johnson, 5320 W. Main, Parsons, Kans. 67357

[21] Appl. No.: 945,234

[22] Filed: Sep. 14, 1992

Related U.S. Application Data

[63] Continuation-in-part of Ser. No. 699,981, May 13, 1991, abandoned.

[51] Int. Cl.6 .................. B21D 39/00; B23K 31/02
[52] U.S. Cl. ................................. 428/593; 428/603; 428/594; 219/121.63; 228/181; 228/157
[58] Field of Search .............. 228/181, 157; 29/897, 29/897.3, 897.32; 219/121.63, 121.64; 428/593, 594, 603; 52/816, 814, 794, 795

[56] References Cited

U.S. PATENT DOCUMENTS

| | | | |
|---|---|---|---|
| 2,700,632 | 1/1955 | Ackerland | 228/181 |
| 3,449,819 | 5/1968 | Blank | 228/181 |
| 3,644,158 | 2/1972 | Strumbos | 156/197 |
| 3,676,635 | 7/1972 | Page | 219/92 |
| 3,924,793 | 12/1975 | Summers | 228/157 |
| 4,361,262 | 11/1982 | Israeli | 228/118 |
| 4,588,651 | 5/1986 | Israeli | 228/118 |
| 4,603,089 | 7/1986 | Bampton | 228/157 |
| 4,755,652 | 7/1988 | La Rocca | 219/121.63 |
| 4,959,522 | 9/1990 | Rossi | 219/121.63 |
| 5,204,161 | 4/1993 | Pettit | 228/157 |
| 5,306,890 | 4/1994 | Minamida | 219/121.64 |

*Primary Examiner*—Mark Rosenbaum
*Assistant Examiner*—James Miner
*Attorney, Agent, or Firm*—Thomas P. Mahoney

[57] ABSTRACT

A core structure, apparatus, and method which utilize laser bonding to fabricate the core structure. The core structure is characterized by laser bonds in patterns between adjacent sheets of aluminum, stainless steel, and titanium foil which create honeycomb core structures when the bonded stack of sheets is expanded by the application of tensional forces thereto. The apparatus achieves the fabrication of the core structure and the steps of the method are practised by either hand or utilization of the apparatus.

12 Claims, 2 Drawing Sheets

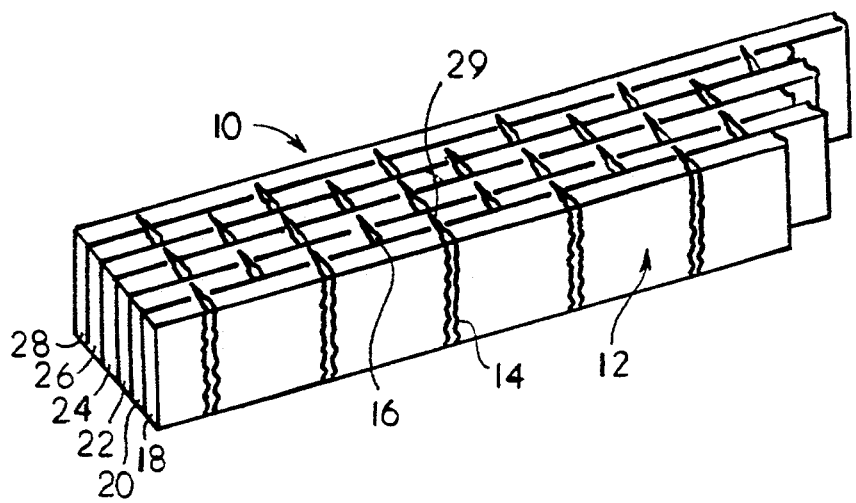
FIG.1
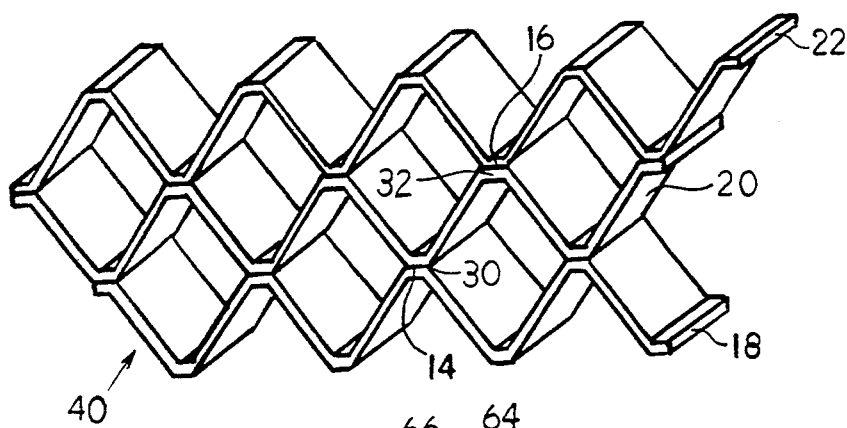
FIG.2
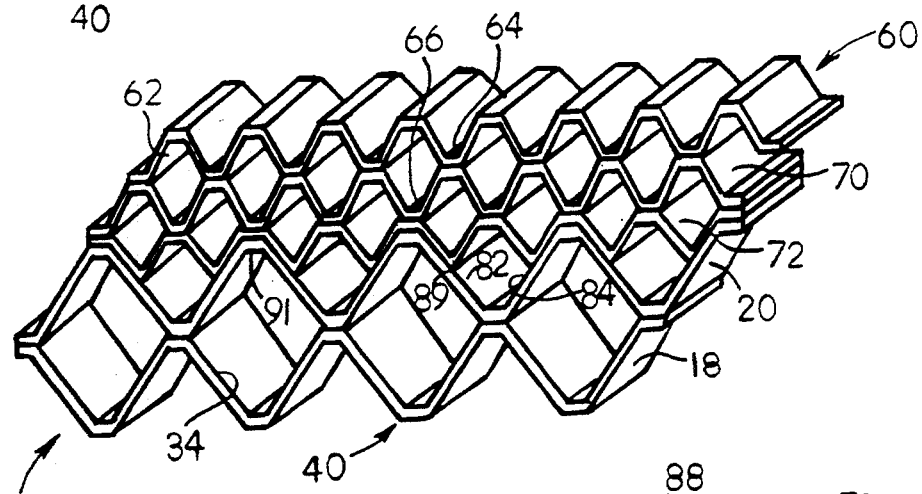
FIG.3A
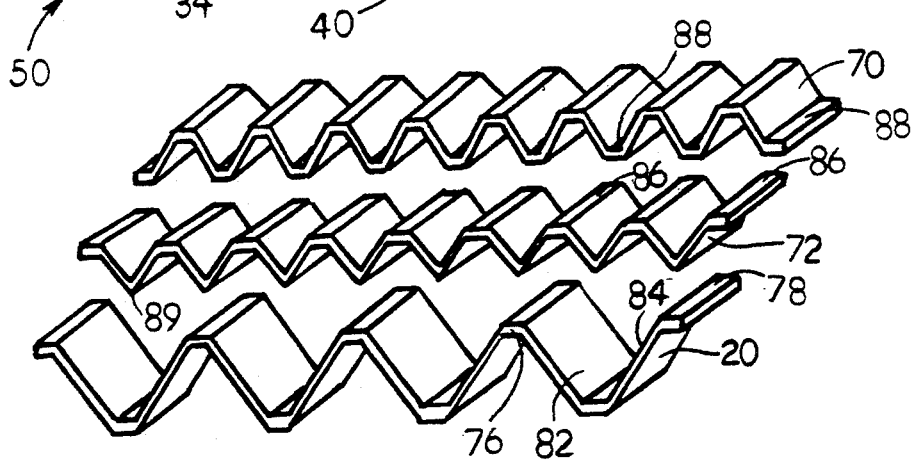
FIG.3B
FIG.3C
FIG.3D

HONEYCOMB CORE STRUCTURE AND METHOD AND APPARATUS RELATING THERETO

This is a continuation-in-part of patent application Ser. No. 07/699,981 filed May 13, 1991, now abandoned.

SPECIFICATION

This invention relates broadly to the securement of sheets or strips of metallic foil to one another by the use of laser technology. More particularly, the invention relates to the securement of such strips or sheets of foil by laser bonds in such a manner as to obtain a desired structural component.

The invention will be described as utilized in the manufacture of honeycomb core whose ultimate intended use, among other uses, is to be incorporated between top and bottom surface sheets to provide a structural panel.

There is, of course, a wide variety of metallic foils available for incorporation in a honeycomb core but, for purpose of illustration, the present disclosure is confined to the utilization of aluminum, stainless steel, and titanium foils.

BACKGROUND OF THE INVENTION

Aluminum honeycomb panels are conventionally fabricated by the use of a plurality of strips of aluminum foil which are bonded to one another by the use of various types of synthetic resin adhesives. Conventionally, the adhesives are applied in parallel bands to the foil strips or sheets which are then successively assembled in juxtaposition to one another so that, when external tensional forces are applied, the stack expands to form a honeycomb core structure.

A detrimental aspect of the utilization of adhesively bonded honeycomb core in the fabrication of structural panels lies in the fact that the top and bottom surface sheets of said panels are frequently assembled in operative relationship with the honeycomb core by the use of resin adhesive materials which must be subjected to temperatures similar to those used in the fabrication of the honeycomb core structure in order to achieve the securement of the sheets to the honeycomb core which is interposed therebetween.

When the adhesively bonded honeycomb core is subjected to these elevated temperatures, the bond is substantially destroyed and the surface sheets are, consequently, maintained in operative relationship with each other by a loosely associated assemblage of corrugated aluminum foil strips.

The strips serve to maintain the surface sheets in operative relationship with each other when the sheets are subjected to loads in tension or compression, but the sheets can only resist shear loads longitudinally of the foil sheet or strips and, consequently, the panels assembled in the above-described manner are not utilizable in many critical structural applications.

Attempts have been made to utilize other means of securing the aluminum foil strips to one another to provide a honeycomb core, such as resistance welding or the like, but such attempts have proven fruitless because of the essential metallurgical structure of aluminum and, particularly, aluminum foils, which is not conducive to the weldment of said foils.

Stainless steel foil honeycomb core is widely used in structural panels and in jet engine seals, the corrugated foil strips constituting said core being welded at the apices or nodes of the corrugated foil strips or sheets to secure them in operative relationship with one another. Such stainless steel welded honeycomb core can be readily brazed to stainless steel sheets since the weldments resist the elevated temperatures which cannot be sustained by adhesively bonded aluminum honeycomb core.

An excellent example of such welded stainless steel honeycomb core is disclosed in U.S. Pat. No. 2,910,153 wherein the stainless steel strips constituting the core structure are welded to one another to provide a rigid, strong and thermally resistant structural panel which can be subjected to high mechanical loads and high temperatures without failure of the weldments and consequent failure of the panel in tension, compression and shear.

However, the manufacture of stainless steel honeycomb core fabricated from sheets or strips of stainless steel foil entails the use of resistance welding circuits and complicated machinery. In many instances, the weldment of the stainless steel sheets or strips to one another entails such high current usage that the panel which is welded to said strips must be subjected to a cooling bath by water or the like.

In addition, the welding process is characterized by the formation of relatively large weld nuggets which frequently constitute stress concentration areas subject to failure when the panels incorporating the stainless steel honeycomb core are subjected to high loads.

Again, titanium foils have been assembled into honeycomb core structures but, as disclosed in U.S. Pat. No. 3,598,953, the assemblage of titanium foil core strips in operative engagement with one another to constitute a core structure entails the utilization of high temperatures sufficient to result in diffusion bonding of the core strips to one another.

All of the prior art methods of fabricating honeycomb core structures have been characterized either by structural deficiencies resulting from the means of attachment of the core strips to one another, as in the case of aluminum or with stainless or titanium, by the necessity for expensive and time-consuming manufacturing processes.

OBJECTS AND ADVANTAGES OF THE INVENTION

It is, therefore, an object of my invention to provide a honeycomb core structure, apparatus and method of making such structure which includes as an integral element of said core structure, apparatus and method the utilization of laser bonds as a means of attachment.

An additional object of my invention is the provision of a honeycomb core structure which is characterized by the elimination of the necessity for preforming the metallic foil into corrugated strips or sheets.

Another object of my invention is the provision of a honeycomb core structure fabricated from aluminum, stainless steel or titanium foils by the incorporation therein of laser bonds.

Another object of my invention is the provision of the identical method for fabricating a sheet or strip assemblage from aluminum, stainless steel, and titanium foils by the use of laser technology, said assemblage being ultimately expansible into a honeycomb structure.

A corollary object of my invention is the provision of a method for fabricating honeycomb core from a variety of sheets or strips of metallic foil which includes the steps of superimposing said sheets or strips successively upon one another and laser bonding said strips or sheets to each other in a pattern which will result in a honeycomb core configuration when said sheets or strips are separated by the application of external tensional forces thereto.

A further object of my invention is the provision of a method of manufacturing honeycomb core which includes varying the laser bonding pattern so that areas of the honeycomb core can be provided with different cell sizes to increase or reduce the density of said core structure and the corresponding load bearing capacity thereof.

An associated object of my invention is the provision of an apparatus for practicing the method and fabricating the honeycomb core of the invention, said apparatus including means for exposing a foil sheet or strip assemblage to a laser beam at pre-determined intervals to establish a pattern which will result in a honeycomb core structure when said assemblage is expanded by the application of external tensional loads.

An associated object of the invention is the provision of an apparatus of the aforementioned character which includes support means for receiving a plurality of superimposed foil sheets or strips and laser beam emitting means translatable relative to said support means to create a predetermined pattern of laser bonds between successive superimposed strips or sheets.

A further object of my invention is a provision in said apparatus of means for applying pressure to said superimposed sheets or strips at the location on said sheets or strips where said laser beam pattern is to be created.

A significant object of the invention is the provision of an apparatus and method of the aforementioned character whereby the laser bonding of the various types of foil into the desired configuration is achieved with economies of manufacture which enable the product to be produced at significantly lower cost than those products produced by the use of the aforementioned prior art expedients.

Further objects and advantages of the invention will be apparent from the following specification and the accompanying drawings.

DESCRIPTION OF THE DRAWINGS

FIG. 1 depicts, on a greatly enlarged scale, a sectional view of an assemblage or stack of metallic foil strips secured together by laser bonds;

FIG. 2 shows a portion of the stack of FIG. 1 in expanded condition;

FIG. 3A shows an expanded honeycomb core wherein a change in the dimension of the core cells is provided in accordance with the teachings of the invention to increase the density of the core structure;

FIGS. 3B, 3C, and 3D illustrate the configuration of the core strips of the core shown in FIG. 3A;

PREFERRED EMBODIMENT OF THE INVENTION

The Metallic Core Structure

Figure 4:
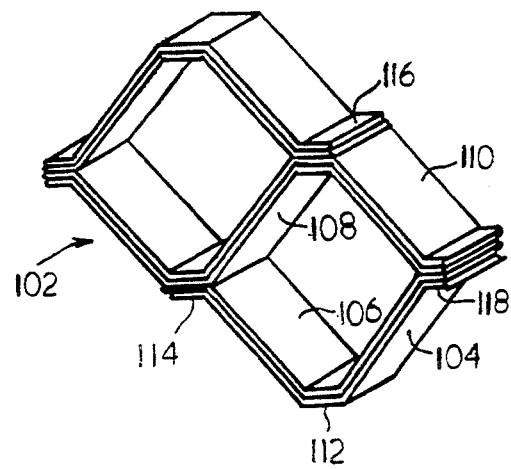
FIG. 4 shows a multiple strip core configuration.

As previously mentioned, the method and apparatus of the invention, to be discussed below, can be utilized to fabricate honeycomb core structures from, among others, sheets or strips of a variety of metallic foils including, but not limited to, aluminum, stainless steel, and titanium.

Therefore, the teachings of the invention relating to the honeycomb core structure will be described sequentially as applied to aluminum, stainless steel, and titanium.

As best shown in FIG. 1 of the drawings, a stack 10 of metallic foil strips 12 has said strips maintained in operative relationship with one another by a plurality of laser created bonds 14 and 16. Of course, the gauge or thickness of the strips 12 is greatly exaggerated to enable the relationship of the strips 12 with one another and the location and extent of the bonds 14 and 16 to be clearly shown.

Obviously, in the actual stack of metallic strips, where the gauge or thickness of the strips ranges from 0.0007" to 0.005", the only perception of the location of the bonds 14 and 16 would be that appearing on the uppermost strip 18. There could be no visual perception of the depth of penetration of the bonds in the strips 12 or the location of the respective bonds 14 and 16 with respect to one another.

The strip 18 is the uppermost strip of the stack and strips 20, 22, 24, 26 have been previously secured to one another and to the lowermost strip 28 by a plurality of laser bonds 14 or 16. The location of the bonds 14 and 16 determines the size and shape of the ultimate honeycomb cell, the laser bonds 14 and 16 of FIG. 1 being located to provide cells of generally square configuration.

The bonds 14 are arranged in alignment with one another as are the bonds 16 and, when the stack is positioned with the strip 28 at the bottom and the strip 18 at the top, the bonds are located in superimposed relationship with one another.

It should be noted that the core strips 18 through 28 have their adjacent surfaces in continuous engagement and contact with one another throughout the stack of core strips and that there are no isolating members or means interposed between the engaging surfaces of said core strips during the bonding operation. This eliminates the necessity for the provision of isolating means or members.

The laser bonds 14 secure the strips 18 and 20; 22 and 24; and 26 and 28 in pairs to each other at predetermined intervals. Similarly, the laser bonds 16 secure the strips 20 and 22, 24 and 26 in pairs to each other intermediate the bonds 14.

Each of the bonds 14 and 16 terminates inwardly of the adjacent surface of the strip which is being secured to the strip where the bond originates. For instance, the bond 14 originates on strip 18 and terminates at 29 inwardly of the adjacent surface of the strip 20 which is being secured to the strip 18. Therefore, inadvertent securement of adjacent strips to one another by penetration of the bonds beyond a pre-determined limit is avoided and there is no necessity for masking adjacent strips to avoid such inadvertent attachment.

There is a wide variety of aluminum alloys available in foil gauges including: AL, commercially pure; A5052; and A5056.

An aluminum honeycomb core section incorporating core strips 18, 20, and 22 is shown in FIG. 2 of the drawings, the expanded core configuration resulting from expansion of the stack 10 by externally imposed tensional loads in a manner to be described in greater detail below. The staggered laser bonds 14 and 16 secure the respective nodal areas 30 and 32 in operative relationship with one another to cause the formation of core cells 34.

Because of the elimination of adhesive bonding and the creation of metal-to-metal bonds between the respective core strips, the resulting aluminum core structure 40 can be utilized in relatively high temperature applications and is not subject to disintegration of the bonds characteristic of resin adhesive core structures. Moreover, the metal-to-metal bonds of the invention are, characteristically, less brittle than resin adhesive bonds and do not add any weight to the core structure as is the case with adhesive bonds.

The utilization of honeycomb core reinforced panels frequently entails the securement of structural or operational devices to said panels. Because of the increased loads, such structures impose on said panels, it is a common practice to install a higher density core insert in the basic core structure at the location where securement of such structures occurs. This is a time-consuming and expensive process.

A variable density core structure 50 is shown in FIG. 3a of the drawings wherein the initial core structure 40 incorporates honeycomb cells 34 of conventional size and wherein a higher density honeycomb core structure 60 is formed integrally with the original core structure 40 by adjusting the spacing of the laser bonds in respect to one another. It will be noted that the increased density core 60 has cells 62 which are much smaller than the cells 34 of the original core structure 40. This is attributable to the closer spacing of the laser bonds 64 and 66.

As can be readily determined from FIGS. 3b-3d of the drawings, the formation of the increased density cell structure includes a regular cell strip 20, a transitional cell strip 72, and a reduced size cell strip 70. Of course, the configuration of all of these cell strip sizes and shapes is created by variations in the spacing of the laser bonds.

The transition strip 72, as best shown in FIG. 3C, incorporates nodal areas 86 and relatively sharply defined transition connections 89. The transition strip 72 is shown as having the nodal areas 86 laser bonded to corresponding areas 88 on the first full strip 70 of the higher density core 60. When the transition strip 72 is internested with the core strip 20, the transitional attachment points 89 are secured to the webs 82 and 84 of the strip 20.

The nodes 86 of the transitional strip 72 are engaged by the nodes 76 and 78 of the strip 20. It will be noted that, at certain nodal areas exemplified at 91 FIG. 3A, there are three layers of metal present in the interface between the full sized core 40 and the higher density core 60; namely, the last full size core strip 20, the transitional core strip 72, and the first core strip 70 of the higher density core 60. The three layers are successively welded to each other.

Of course, the size and shape of the insert core 60 can be controlled by the same computer control technology and an ultimate reversion to the original core size 40 can be so accomplished as to permit the inclusion of an insular higher density core structure 60 in the overall full size core structure 40.

It should be pointed out that the formation of the nodal areas as, for instance, defined by the laser bonds 14 and 16 may not be as uniform as shown in FIGS. 1-3D of the drawings in that there may be a sharper angle between the nodal areas and the webs of the cells. However, if broad, flat nodal areas are desired, double bonds can be provided to accomplish such a structural modification.

Where increased physical characteristics are desired in a honeycomb core without reducing the cell size, a plurality of core strips can be super-imposed on one another to provide a core structure 102 as best shown in FIG. 4 of the drawings.

The core structure 102 utilizes a plurality of core strips 104, 106, 108, and 110. These strips are bonded to one another by laser bonds at the nodal areas 112, 114, 116, and 118. Of course, the intensity of the laser beam must be increased in order to accomplish the securement of the plurality of core strips to one another at the nodal areas. This structure can also be produced one strip at a time. The provision of the multiplicity of core strips greatly enhances the density of the core 102 and the corresponding physical properties thereof.

As previously indicated, the core structures of the invention can be fabricated from metallic foils other than aluminum. For instance, stainless steel foils, including AMS, 4900/4901/4902 can be utilized to fabricate the core structures. These structures are intended for low strength applications and structures of moderate strength can be achieved utilizing 321 and 316 stainless. In addition, Inconel 625 and 718 can be utilized. Of course, as the metallurgical composite of the materials utilized varies, a corresponding increase or decrease in the intensity of the laser beam must be utilized to achieve effective laser bonding of the core strips or sheets fabricated from the more sophisticated materials to one another.

Commercially pure titanium foils can be utilized in low strength applications while, for moderate strength applications, TI3A1-2.5 V can be employed. As in the case of stainless steel foils, the laser beam output must be adjusted to achieve the securement of the titanium foil strips and sheets to one another.

The range of foil thickness extends between 0.0010"–0.0060" although the gauges customarily employed lie in the range of 0.0020"–0.0050".

I have discovered that laser bonded honeycomb core structures fabricated from the various foils are stronger than those fabricated by conventional means. This, of course, means that lighter gauge foils can be employed in structures where prior art foils would have to be a heavier gauge. Consequently, significant economies in material costs result.

For instance, ASTM specifications for 0.002" thick 18Ni-2Cr stainless, where the stainless core is resistant welded, require that the core sustain 72 lbs. per inch of core thickness. Utilizing the same gauge material, laser bonded honeycomb core has sustained 95 psi in pull tests.

Similarly, the same gauge resistance welded pure titanium foil is specified by ASTM at 55 lbs. per inch of core thickness. Pull tests of laser bonded titanium foil core reached 165 psi.

Of course, there are no standards for aluminum core because of the fact that aluminum core structures have been previously created by the utilization of various types of synthetic bonding materials. However, the laser bonded aluminum foil of the 0.0020 gauge sustained a pull test of 27 psi.

While there are no comparative figures for aluminum, it is obvious that the laser bonded honeycomb core structures of the invention show a three times improvement in physical characteristics in the case of titanium and a 50% improvement in the case of stainless steel. A manifest improvement in laser bonded aluminum foil core structures is attributable to the elimination of the use of previous bonding materials.

Moreover, a study of the fabrication rates of honeycomb core by the previous methods and apparatus referred to hereinabove indicates that honeycomb core materials which are laser bonded can be produced at rates of production which far exceed those presently achievable in the production of conventional core structures. Consequently, the production of honeycomb core structures in accordance with the teachings of the invention should enable significant economies to be achieved with resultant reductions in the costs of the ultimate products incorporating such core structures.

THE APPARATUS OF THE INVENTION

Figure 5:
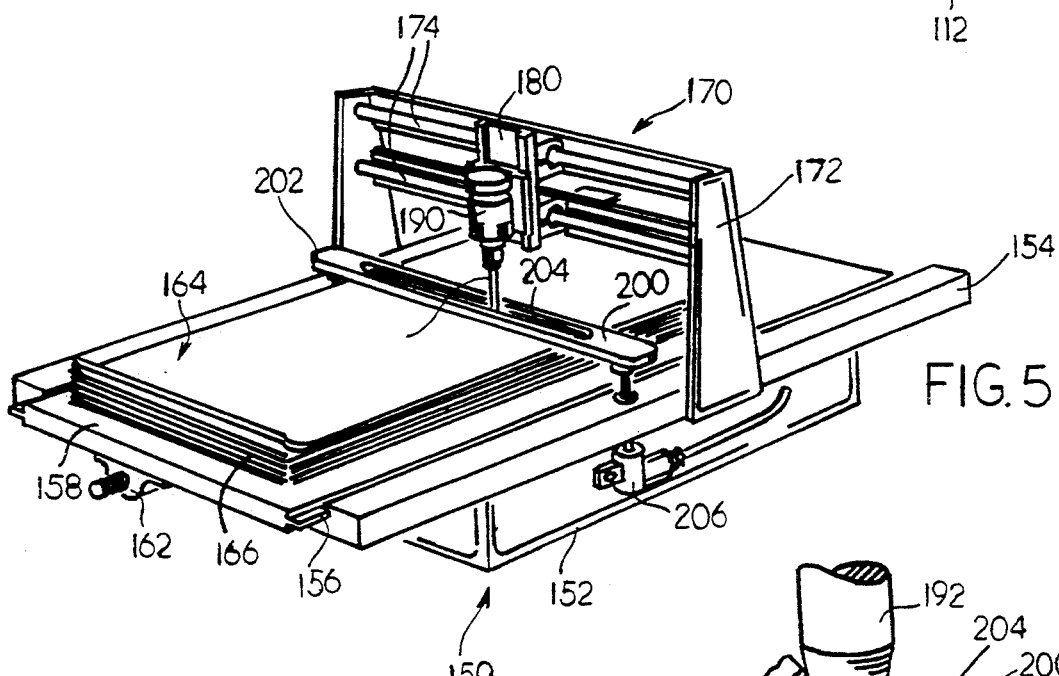
FIG. 5 shows, schematically, the apparatus of the invention.

An apparatus 150 for fabricating the core structures of the invention is shown in FIG. 5 of the drawings as including a support means 152 for an elongated rectangular bed 154. Mounted for reciprocation on ways 156 is a table 158, said table being driven by drive means 162.

The table 158 constitutes support means for a stack 164 of sheets 166 of metallic foil and energization of the drive means 162 moves the table 158 longitudinally on the bed 154. Extending transversely of the bed 154 and table 158 is a laser traversing means 170, said traversing means including a plurality of vertically oriented standards 172 for a plurality of transversely oriented support and guide beams 174.

Mounted for automatic movement on the traversing assembly 170 is a laser assemblage 180 which includes a laser head 190, said laser head having a depending laser beam guide 192.

Mounted below and juxtaposed to the laser assembly 190 is compression means 200, said compression means including a transversely oriented compression bar 202 incorporating an elongated slot 204 permitting access to a predetermined area of the uppermost sheet 166 of the stack 164 of sheets. The compression means 200 includes an actuator 206 for automatically raising and lowering the compression means, respectively, away from and into engagement with the upper surface of the uppermost sheet 166 of the stack 164.

It is contemplated that the apparatus 150 will be automatically controlled by computer numerical control so that the position of desired patterns of laser bonds and stack 164 of sheets 166 can be accomplished to provide a core or other structure which is of predetermined configuration, core cell size and foil material.

The apparatus 150 is the most rudimentary apparatus which can automatically perform the method of the invention, but it will be obvious to those skilled in the art that the teachings of the invention can, if necessary, be performed by hand utilizing a plurality of hand manipulated components and laser head.

On the other hand, the apparatus can be provided with a plurality of laser heads to increase the speed of production of the core strips and can be provided with automatic foil feeding means which eliminate the necessity for the hand stacking of sheets 166 in a stack 164.

THE METHOD OF THE INVENTION

Figure 6:
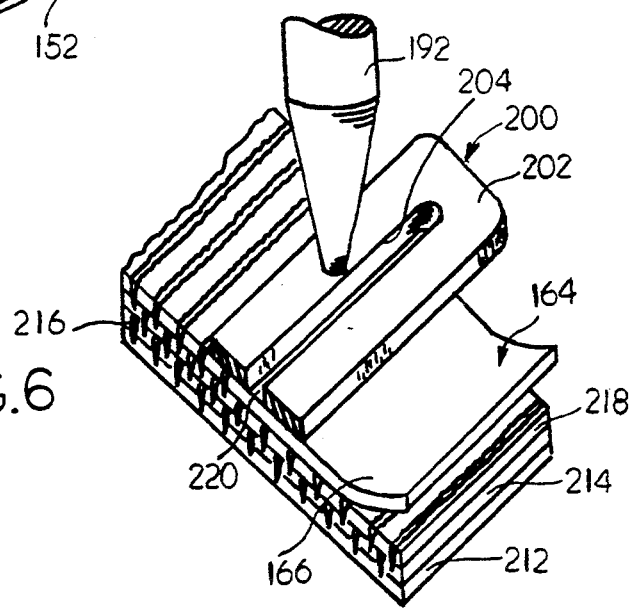
FIG. 6 is a fragmentary view showing the formation of a stack of strips by the utilization of compression means imposed on the uppermost of the strips in said stack.

The fabrication of a typical core structure begins with the placement of the first two sheets 212 and 214 in stacked relationship, as best shown in FIG. 6 of the drawings. After the placement of the first two sheets 212 and 214, the apparatus 150 is energized to lower the compression means 200 constituted by the elongated bar 202 into engagement with the upper surface of the upper sheet 214 to create intimate contact between the under surface of the sheet 214 and the upper surface of the sheet 212 in order that a laser bond may be created in a previously determined pattern by the laser apparatus 190 which emits a bonding beam which passes through the slot 204 in the compression bar 202 to laser bond the sheets 212 and 214 by the bond 216.

When the initial bonds are completed by the apparatus as driven by the numerical control, a third sheet 218 is deposited upon the upper surface of the sheet 214, the compression means 200 having been automatically raised to permit the sheet 218 to be so deposited. The compression bar 202 is then automatically lowered to compress the surfaces of the sheets 218 and 214 against one another and the traverse of the laser apparatus on the traversing assemblage 170 is initiated.

Obviously, successive patterns are created by relative movement of the table 158 with respect to the traversing assemblage 170 and the frequency and extent of such relative movement determines the bond patterns. The numerical control can be programmed to alter the number and spacing of the bonds to achieve the alteration of the cell sizes and configurations of the core structure.

The bond zone 220 is accessible through the slot 204 in the compression bar 202 and the individual bonds 216 can be rapidly formed between the adjacent sheets.

As previously mentioned, it is of utmost importance that the lower extremity of the bonds 216 do not penetrate the adjacent surface since this would cause the undesirable bonding of adjacent sheets to one another. In order to accomplish this desired end, it is necessary to fine tune the laser by empirical experimentation and to fabricate experimental coupons for each run of material since minute variations in the foil stock must be accommodated to ensure proper bonding of the sheets or strips of stock to one another.

However, I have established empirically the following setting for a YAG laser of the specified type for bonding aluminum 0.0020 foil sheets to one another as follows:

A YAG laser using 90 w of power with a 20 per second pulse rate with a pulse width of 4 MEC at a laser bond speed 100 miles per minute. Adjustment of all of the above obtains the depth of the bond.

Of course, visual inspection of the test samples of any run permits the determination of the undesirable penetration of the bonds beyond the optimum limit and indicates the necessity for reduction in the intensity of the laser beam. In addition, if the penetration of the bond exceeds desired limits, the resulting product would be inoperative.

After the completion of a stack of foil incorporating the desired number of sheets with each pair of sheets defining a row of cells, the stack of sheets is subjected to tension normal to the surface of the uppermost sheet and the underside of the lowermost sheet to expand the stack into the core configuration shown in the drawings. This expansion can be accomplished by inserting a pair of rods or bars in the uppermost core cells and lowermost core cells and creating an external tensional force therebetween. As the stack of sheets is expanded by the externally applied tension, the cells assume the desired configuration and there is no stretching or distortion of the foil material since the application of tensional forces is terminated once the desired core configuration is achieved.

One of the most important aspects of the method of the invention lies in the fact that the foil sheets or strips are superimposed on one another without the utilization of any form of isolating means such as dielectric coatings or inserts between the confronting surfaces of the foil sheets or strips. This eliminates a tremendous expense factor which is entailed where resistance welding methods are utilized in the securement of stainless steel or titanium materials.

Although I have disclosed hereinabove various embodiments of core structure, a particular apparatus, and the method of the invention, it will be obvious to those skilled in the art that variants of structure, apparatus, and method can be made without departing materially from the scope of the appended claims.

I claim:

1. In an expandable honeycomb core metallic foil sheet assemblage, the combination of: a plurality of foil sheets disposed in a stack with the entire areas of their confronting surfaces in contact, said sheets having top and bottom surfaces; and a plurality of weldments between said sheets, said weldments being uniformly disposed at spaced intervals to cause said sheets, when said stack is subjected to tensional forces at the top and bottom, to expand without tensional stretching of said sheets to impart a uniform honeycomb configuration to said stack.

2. The assemblage of claim 1 in which said weldments terminate above the bottom surfaces of each of said sheets.

3. The assemblage of claim 1 in which the depth of penetration of said laser weldments in said sheets is controlled so that inadvertent securement of one sheet to another is prevented.

4. The assemblages of claim 1, 2, or 3 in which said foil is an aluminum alloy.

5. The assemblages of claim 1, 2, or 3 in which said foil is a stainless steel alloy.

6. The assemblages of claim 1, 2, or 3 in which said foil is a titanium alloy.

7. The assemblage of claim 1 in which additional weldments are formed in said assemblage between said uniformly disposed weldments to provide a first honeycomb cell size defined by said uniformly disposed weldments and a second honeycomb cell size defined by said additional weldments and integral with said first honeycomb cell size.

8. In a honeycomb core structure, the combination of: a plurality of sheets of metallic foil; and uniformly spaced laser weldments between pairs of said metallic foil sheets to secure said sheets to each other at uniformly spaced intervals, said sheets being of corrugated configuration and joined to each other at adjacent nodes by said laser weldments.

9. The honeycomb core of claim 8 in which additional sheets have additional weldments disposed between said uniformly spaced weldments to define honeycomb cells of different size from said honeycomb cells formed by said first uniformly spaced laser weldments.

10. In a honeycomb cell core structure, the combination of; a first series of cells of one size formed by a first series of uniformly spaced laser weldments; and a second series of honeycomb cells of another size formed by a second series of uniformly spaced laser weldments, said honeycomb cell core structure being fabricated from sheets of metallic foil.

11. The honeycomb core of claim 10 in which said first and second cell series are integral with each other.

12. The honeycomb core of claim 10 in which said second cell series imparts greater structural density to said core than said first cell series.

* * * * *

UNITED STATES PATENT AND TRADEMARK OFFICE
CERTIFICATE OF CORRECTION

PATENT NO. : 5,437,936
DATED : August 1, 1995
INVENTOR(S) : Jeffrey D. Johnson

It is certified that error appears in the above-indentified patent and that said Letters Patent is hereby corrected as shown below:

Column 8, line 58, change "miles" to--inches--.

Column 9, line 34, insert--laser--after "of".

Signed and Sealed this

Seventh Day of November, 1995

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,437,936
DATED : August 1, 1995
INVENTOR(S) : Jeffrey Don Johnson

It is certified that error appears in the above-identified patent and that said Letters Patent is hereby corrected as shown below:

Column 8,
Line 57, after "width of 4", replace "MEC" with -- MSEC --.

Signed and Sealed this

Twenty-fifth Day of September, 2001

Attest:

NICHOLAS P. GODICI
Attesting Officer    Acting Director of the United States Patent and Trademark Office